United States Patent [19]

Rudy

[11] 4,324,151
[45] Apr. 13, 1982

[54] FOUR QUADRANT CONTROL LEVER RESTRAINT
[75] Inventor: Douglas W. Rudy, Lombard, Ill.
[73] Assignee: International Harvester Company, Chicago, Ill.
[21] Appl. No.: 148,647
[22] Filed: May 12, 1980
[51] Int. Cl.³ ............................................. G05G 5/06
[52] U.S. Cl. ...................................... 74/532; 74/475; 70/199
[58] Field of Search ................. 74/475, 527, 526, 532; 70/192, 193, 199, 202, 238

[56] References Cited
U.S. PATENT DOCUMENTS
1,395,966 11/1921 McManus ............................. 70/199
FOREIGN PATENT DOCUMENTS
2610205 9/1976 Fed. Rep. of Germany ........ 74/527
466676 12/1913 France ................................. 74/475

Primary Examiner—Kenneth Dorner
Attorney, Agent, or Firm—F. D. AuBuchon

[57] ABSTRACT

A control lever 10 is restrained in a neutral position through the interaction of a perforated hinged plate 24 with a horizontal rod 16 extending from said control lever 10. The hinged plate 24 is provided with a spring 44 to urge the plate into engagement with the upwardly extending end portion 20 of the rod 16 attached to the control lever 10. The hinged plate 24 is provided with a cutout 48 having a depth greater than the diameter of the control lever to prevent transverse movement of the control lever 10 when the plate 24 is in a restraining position. The spring 44 also urges the hinged plate 24 into disengaged over center position when the lever restraint is in a disengaged mode.

7 Claims, 3 Drawing Figures

FOUR QUADRANT CONTROL LEVER RESTRAINT

BACKGROUND OF THE INVENTION

This device is a locking device to hold one or a plurality of control levers in a stationary, generally neutral position. A spring actuated over center hinged plate is provided with apertures that may constrain the movement of the control lever through interaction with a projecting rod mounted on the control lever. A substantial cutout in the hinged plate is also provided to restrain the movement of the control lever in directions transverse to the fore-and-aft direction of the control lever. Generally the fore-and-aft direction of the control lever will be controlled by the horizontal rod engagement with the hinged plate and transverse movement of the control rod will be restrained by the interaction of the hinge plate cutout with the control lever.

The prior art includes devices that restrain the movement of the control levers. The most obvious types of devices utilize spring loaded detents that may be overridden by an operator when the detented lever is displaced with a certain degree of force. shift levers of automobiles often are guided by a shift gate that assists in proper gear selection. These gates have been designed in certain cases to positively lock out given gears that are not engaged during normal driving. Reverse gear would be an example.

Shift levers have also been designed where a latch mechanism has been incorporated into the lever that would be fingertip controlled to release a lever. This also prevented inadvertent gear shifts.

The closest prior art known by the Applicant involves a transmission lever lockout device where a spring biased plate having a slot formed in the active portion so as to make a U-shape plate can be flipped over to engage the shift lever and prevent relative fore-and-aft displacement.

The device does not positively prevent the movement of the lever as the lever would still be free to move horizontally through the slot in the plate. A device also relevant to this invention is the invention assigned to the same assignor of this invention entitled POSITIVE LEVER LOCATION MAINTENANCE TRAP. That device utilized a flip-over hinged plate identical to the device of this invention. However it only prevented fore-and-aft movement of the control lever and allowed the lever to move transversely to the fore-and-aft plane.

In off highway construction equipment such as an articulated four wheel drive loader having a boom mounted hydraulically operated scoop at the front end thereof it is occasionally necessary to maintain the levers controlling the scoop hydraulics in a neutral position. This is oftentimes necessary when the vehicle is being serviced and the scoop would be at rest on the ground. With the levers restrained in neutral an accidental jostling of them such that the scoop is moved may be prevented. This invention is directed toward providing a positive control lever restraint device that prevents a control lever from being moved into any quadrant when the lever is engaged.

It is also occasionally desirable to maintain a hydraulic control lever in neutral when the host vehicle is being driven, towed on the road or towed on a trailer. Thus a device such as this invention, that would not be disengageable by vibration is desirable. The spring of this apparatus will tend to keep the device engaged in situations where normal vibrations may rattle a lever without the device out of a neutral position.

The instant invention includes a plurality of advantages that make it more desirable than the prior art known to the Applicant. Among these advantages is that the device will positively lock the control lever in a neutral position relative to the lever's path of normal travel, whether the normal travel is in a fore-and-aft plane, a plane transverse to the fore-and-aft plane, or any direction between these two extremes.

Another advantage is that the horizontal rod portion is removable from the control lever. This allows the control lever dust boot to be taken off and replaced over the handle of the control lever rather than necessitating the complete removal of the lever to replace the boot or gain access to the lever fulcrum cover box.

Another advantage of this device is that the spring tension will be predictable in both the engaged and disengaged positions. When engaged the hinged portion is prevented from going beyond a horizontal deployment by the arcuate rod stop fastended to the control lever. Also, when disengaged the hinged portion is prevented from going beyond a predetermined point. As these engaged and disengaged positions are predeterminable then a spring with appropriate characteristics, primarily length and tension can be selected. Spring selection would yield a spring that would always be under some tension thus preventing it from being inadvertantly disengaged.

Another advantage is that the structure of the horizontal rod includes an arcuate rod stop that functions to locate the horizontal rod and also to provide increased strength in the control lever in the area where the control lever has been drilled through to accept the horizontal rod. As stated earlier the arcuate rod stop also functions as a limiting means to support the hinged plate when the hinged plate is in position around the control lever.

Another advantage is that this invention can be retrofitted to unequipped machines with only minimum modifications of the machine. The device is inexpensive to manufacture yet capable of being sturdily constructed to provide a control lever restraint that prevents the movement of a control lever into any quadrant when the lever restraint is in an engaged position.

SUMMARY OF THE INVENTION

A four quadrant control lever restraint is made up of two basic elements. A hinged plate having at least a single aperture and a substantial cutout in a leading edge of a movable leaf is pivotable to a horizontal position in alignment with a stationary leaf of the hinged plate. The stationary leaf is integral with a mounting plate which is perforated to accept attaching fasteners. A projecting tab is integral with and extends outwardly from the mounting plate.

A second element is a horizontal rod having an upwardly extending forward portion and a threaded aft portion. An arcuate rod stop is affixed to the rod to locate it on the control lever to be restrained and to provide a contact surface for contact with the movable leaf to prevent the leaf from going below a horizontal position.

BRIEF DESCRIPTION OF THE DRAWING FIGURES

The objects and advantages of this invention will be understood as the specification is read and the drawing figures are referred to wherein:

FIG. 1 presents a top view of the invention as it would be mounted in a typical embodiment;

FIG. 2 presents an elevation view of the invention shown in FIG. 1; and

FIG. 3 presents an elevation view of the invention shown in FIG. 1 with the lever restraint in a disengaged mode.

DETAILED DESCRIPTION OF THE INVENTION

Figure 1:
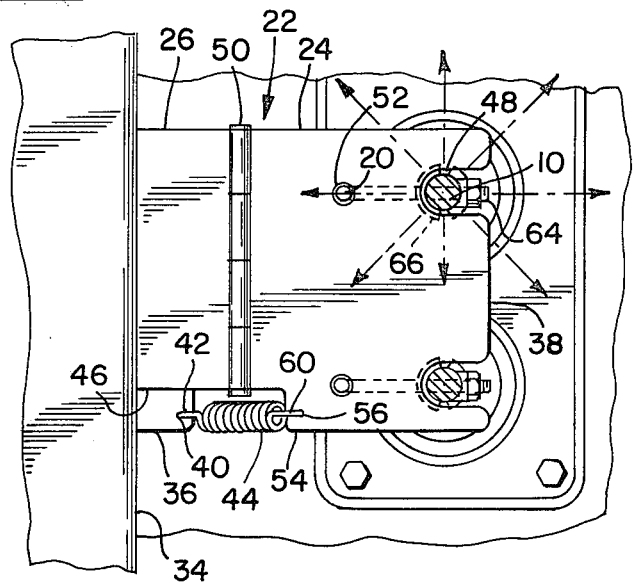
Figures 2, 3:
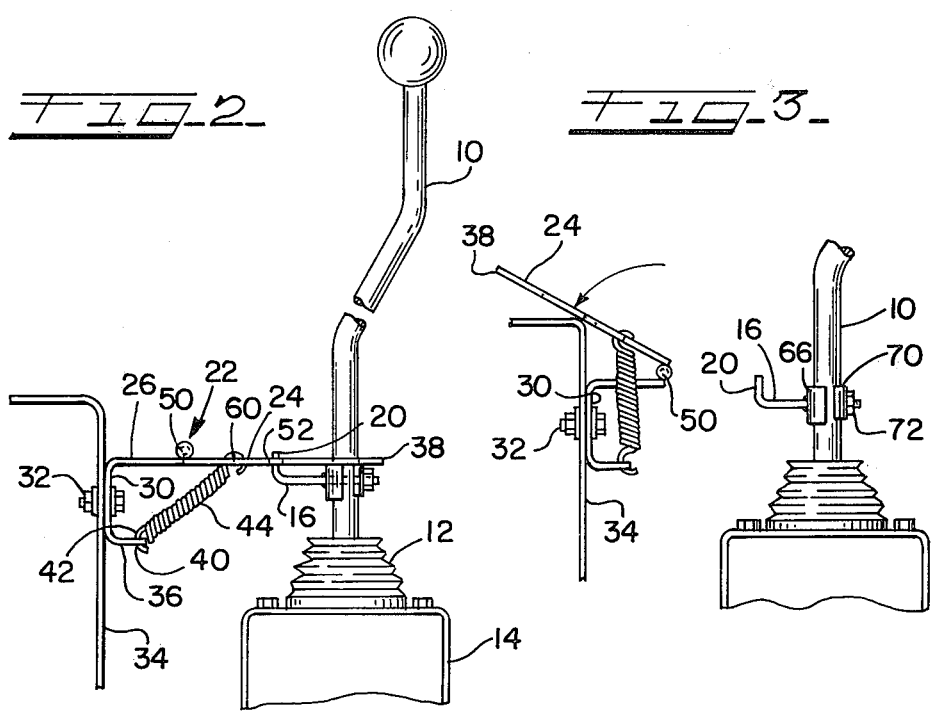

A comprehensive overview of the invention can be seen by examining FIGS. 1, 2, and 3. In FIG. 2 a control lever 10 is shown projecting through a dust boot 12 into a lever fulcrum cover box 14 in a conventional fashion. In a specific embodiment of the invention a control lever would be a hydraulic control lever for affecting the direction of travel of an articulated vehicle, a skid steer type vehicle or another type vehicle utilizing a joy stick type control for guiding the vehicle. Also, this type of control lever restraint could be used to control the position of a joy stick type control lever used in, for instance, the operation of the digging mechanism in a backhoe. Other embodiments are also contemplated by the inventor and these mentioned should not be construed as limiting the scope of the invention.

Oftentimes a bank of several control levers will be arranged together and FIG. 1 shows the use of the hinged plate for constraining the movement of a pair of control levers.

Attached to the control lever 10 is a horizontal rod 16 with an upwardly extending end portion 20.

Another basic element of this invention is the hinged plate generally 22 having a movable leaf 24 and a stationary leaf 26 horizontally disposed and aligned with the movable leaf 24. The stationary leaf 26 is integral with the mounting plate 30 which may be provided with mounting fasteners such as 32 to allow mounting of the lever restraint to an adjacent surface such as structural panel 34. Structural panel 34 will extend vertically above the hinged plate generally 22. Extending from the mounting plate 30 is a projecting tab 36 which is provided with an aperture 40 for accepting the first end 42 of a coil spring 44. The projecting tab 36 is located such that the aperture 40 is outboard of a vertical plane from the edge of the stationary leaf 26 at least a distance equal to the radius of the spring 44 in order that the spring may be extended vertically above the hinged plate generally 22 when the movable leaf 24 is rotated around hinge pin 50 to the position shown in FIG. 3.

The movable leaf 24 is provided with at least one aperture such as 52 to accommodate the upwardly extending end portion 20 of the horizontal rod 16. The movable leaf 24, as best seen in FIG. 1 is also provided with a cutout 48 that extends inwardly from the leading edge 38 of the movable leaf 24. The cutout will have a depth typically greater than the diameter of the control rod 10 such that control rod when in a neutral position will be generally at the forward end of the cutout. The movable leaf 24 also includes an appendage 54 which is provided with an aperture 56 to accept the second end 60 of the spring 44. The apertures 40 and 56 in the projecting tab 36 and the appendage 54 respectively are generally aligned in the same vertical plane so that the spring 44 will not contact the edge 46 of the stationary leaf 26 or the adjacent end of the hinge pin 50.

The control lever 10 is provided with a bore transverse to the longitudinal axis thereof through which a threaded portion 64 of the horizontal rod is inserted. In a preferred embodiment an arcuate rod stop 66 is provided on the rod 16 between the upwardly extending end portion and the threaded portion in a nonmovable manner and then the rod is projected through the bore and a compatible arcuate washer 70 and a nut 72 are tightened on the threaded end 64 to hold the horizontal rod in place. The arcuate rod stop 66 provides a surface upon which the movable leaf 24 will rest when it is in a position to engage the control lever. This will prevent the spring 44 from bringing the movable leaf too far below a horizontal position thereby loosening the spring. Furthermore, the arcuate rod stop 66 adds strength to the control lever 10 which may be weakened in the area of the bore thus minimizing the adverse affect drilling of the bore would have on the control lever.

FIG. 3 shows the movable leaf 24 in a disengaged position and resting against structural panel 34. It is important to note that the movable leaf is prevented from going all the way counterclockwise to a horizontal position as this prevents the spring 44 from becoming loose enough to be vibrated out of its attaching apertures. Since the movable leaf 24 is always longer, that is, from the hinge pin to the parallel edge surface than the stationary leaf 26, as long as a portion of the panel to which the lever restraint is mounted extends sufficiently above the plane of the stationary leaf the movable leaf will always contact the structural panel before tension on the spring 44 is too weak to hold the spring in place.

To operate the four quadrant control lever restraint the vehicle operator will position the control lever 10 in neutral and simply flip the movable leaf toward the lever. The leaf will go over center and the spring tension will hold it horizontal against the arcuate stop 66. The upwardly extending end of the horizontal rod 16 will be trapped in the aperture 52 of the movable leaf while the control lever itself will be engaged on its side by the cutout portion of the movable leaf. Thus, movement of the control lever in both a fore-and-aft plane as well as all directions in planes transverse to the fore-and-aft plane will be restrained by the control lever restraint apparatus. The directions referred to are shown in FIG. 1 by the arrows drawn thereon which indicate some of the possible directions in which the control lever will be restrained.

In FIG. 1 two control levers are shown and it can be seen how one movable leaf can accommodate more than one lever. Where a plurality of control levers are to be maintained it is possible to include the upwardly extending rod on only one control rod—only one aperture would be provided to accommodate the rod. This would not be preferred, however, as any control lever not equipped with a rod would be movable aft in the fore-and-aft vertical plane. It is also contemplated that the plurality of aligned apertures and cutouts could be provided in the movable leaf of the hinged plate in order that multiple levers could be held in displacement positions as necessary.

Thus it can be seen that there has been provided a four quadrant control lever restraint that satisfies the objects and aims set forth in this specification. While the invention has been described in conjunction with the specific embodiment thereof it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. In a vehicle having a hydraulic working circuit and a control for adjusting flow through said circuit the improvement comprising:

a control lever operable in a plurality of quadrants, said control lever having a bore provided therethrough transverse to the longitudinal axis of said control lever;

a rod having an upwardly extending end portion, said rod positioned into said bore of said control lever and projecting forwardly from said control lever;

a hinged plate having a mounting plate surface and a stationary leaf extending from said mounting plate surface toward said control lever, said stationary leaf having an edge, a movable leaf connected to said stationary leaf through a hinged pin on said stationary leaf, said movable leaf having an aperture therethrough of a diameter large enough to accommodate said upwardly extending portion of said rod, a cutout at a leading edge of said movable leaf having a width and depth sufficient to accommodate said control lever and an appendage provided with an aperture therethrough;

a projecting tab extending forward from said mounting plate surface toward said control lever, said projecting tab having an aperture outboard of a vertical plane corresponding to said edge of said stationary leaf, said aperture of said projecting tab aligned in the same vertical plane as said aperture in said appendage of said movable leaf;

a spring having a first end connected through said aperture of said projecting tab and a second end connected through said aperture of said appendage of said movable leaf.

2. The invention in accordance with claim 1 wherein said rod comprises a horizontal rod having an upwardly extending end portion at one end thereof and a threaded portion at the other end thereof;

an arcuate rod stop having an aperture therethrough for accommodating said rod, said arcuate rod stop positioned on said rod and providing a contact surface for contacting the movable leaf of said hinged plate when said movable leaf is in a horizontal position and said control lever is accommodated in said cutout of said movable leaf.

3. The invention in accordance with claim 2 wherein said arcuate rod stop provides a contact surface for contacting the movable leaf of said hinged plate when said movable leaf is in a horizontal position whereby the hinged plate will be prevented from being urged below a horizontal position and said spring will remain under tension.

4. The invention in accordance with claim 1 wherein said hinged plate mounting plate surface is provided with a mounting fastener for mounting said hinged plate to a structural panel having a surface extending vertically above said hinged plate stationary leaf whereby said movable leaf will be limited in arcuate travel around said hinged pin on said stationary leaf.

5. The invention in accordance with claim 1 wherein said movable leaf has a horizontal length greater than the horizontal length of said stationary leaf.

6. In a vehicle having a hydraulic working circuit and controls for adjusting flow through said circuit the improvement comprising:

a plurality of control levers each operable in a plurality of quadrants, a first of said plurality of control levers having a bore provided therethrough transverse to the longitudinal axis of said control lever;

a rod having an upwardly extending end portion positioned into said bore of said first control lever and projecting forwardly from said control lever, said rod comprising an upwardly extending end portion, a threaded portion and an arcuate rod stop on said rod between said upwardly extending end portion and said threaded portion;

a hinged plate having a mounting plate surface and a stationary leaf extending from said mounting plate surface toward said control lever, said stationary leaf having an edge, a movable leaf connected to said stationary leaf through a hinged pin on said stationary leaf, said movable leaf having an aperture therethrough to accommodate said upwardly extending end portion of said rod, a plurality of cutouts at a leading edge of said movable leaf, each cutout having a width and depth sufficient to accommodate one of said plurality of control levers.

7. The invention in accordance with claim 6 wherein each of said plurality of control levers have a bore therethrough transverse to the longitudinal axis of said control levers;

a plurality of rods each rod positioned into a bore of each of said control levers whereby each control lever will be associated with a single rod and arcuate rod stop;

said movable leaf of said hinged plate having a plurality of apertures therethrough and a plurality of cutouts each to accommodate one of said control lever and rods when said movable leaf is in a horizontal position resting on said arcuate rod stop.

* * * * *